United States Patent
Xu et al.

(10) Patent No.: US 8,566,465 B2
(45) Date of Patent: Oct. 22, 2013

(54) SYSTEM AND METHOD TO DETECT AND MITIGATE DISTRIBUTED DENIAL OF SERVICE ATTACKS USING RANDOM INTERNET PROTOCOL HOPPING

(75) Inventors: Gang Xu, Piscataway, NJ (US); Gustavo de los Reyes, Fair Haven, NJ (US); Thusitha Jayawardena, Holmdel, NJ (US); Xiao Pan, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 354 days.

(21) Appl. No.: 12/884,976

(22) Filed: Sep. 17, 2010

(65) Prior Publication Data
US 2012/0072605 A1 Mar. 22, 2012

(51) Int. Cl.
*G06F 15/173* (2006.01)

(52) U.S. Cl.
USPC .......................................... 709/229; 709/226

(58) Field of Classification Search
None
See application file for complete search history.

(56) References Cited

U.S. PATENT DOCUMENTS

| | | | |
|---|---|---|---|
| 6,834,310 B2 | 12/2004 | Munger et al. | |
| 6,880,090 B1 * | 4/2005 | Shawcross | 726/14 |
| 7,028,179 B2 | 4/2006 | Anderson et al. | |
| 7,933,990 B2 * | 4/2011 | Munger et al. | 709/225 |
| 2002/0040400 A1 * | 4/2002 | Masters | 709/228 |
| 2004/0054924 A1 | 3/2004 | Chuah et al. | |
| 2004/0098479 A1 | 5/2004 | Bennett | |
| 2005/0111367 A1 | 5/2005 | Chao et al. | |
| 2005/0157647 A1 | 7/2005 | Sterne et al. | |
| 2005/0220017 A1 | 10/2005 | Brand et al. | |
| 2006/0069912 A1 | 3/2006 | Zheng et al. | |
| 2006/0212572 A1 | 9/2006 | Afek et al. | |
| 2007/0143846 A1 | 6/2007 | Lu | |
| 2010/0138559 A1 | 6/2010 | Sullivan et al. | |

\* cited by examiner

*Primary Examiner* — Hassan Phillips
*Assistant Examiner* — Omeed D Rahgozar
(74) *Attorney, Agent, or Firm* — Akerman Senterfitt; Michael K. Dixon; Roy Zachariah (57) ABSTRACT

A method includes sending a first redirect instruction to a first client in response to a first session request received at a service address, and establishing a first session with the first client in response to a second session request received at the first redirect address indicated by the first redirect instruction. Additionally, the method includes determining a first service interval has passed, and sending a second redirect instruction to a second client in response to a third session request received at the service address after the first service interval has passed. The method still further includes establishing a second session with the second client in response to the fourth session request received at the second redirect address indicated by the second redirect instruction after the first service interval has passed, and rejecting the fifth session request received from a third client at the first redirect address after the first service interval has passed.

14 Claims, 6 Drawing Sheets

SYSTEM AND METHOD TO DETECT AND MITIGATE DISTRIBUTED DENIAL OF SERVICE ATTACKS USING RANDOM INTERNET PROTOCOL HOPPING

FIELD OF THE DISCLOSURE

The present disclosure generally relates to communications networks, and more particularly relates a system and method to detect and mitigate distributed denial of service attacks using random Internet Protocol hopping.

BACKGROUND

Packet-switched networks rely on the efficient transmission of packets across network links. Malicious entities often attempt to disrupt this efficient data flow using denial-of-service (DoS) attacks whereby a network device is flooded with a large volume of network traffic. The resources and bandwidth of the network device are then consumed in handling this flood of network traffic. As a result, the network device is forced to begin dropping packets associated with legitimate packet flows, thus reducing throughput and quality of legitimate network services provided by the network device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
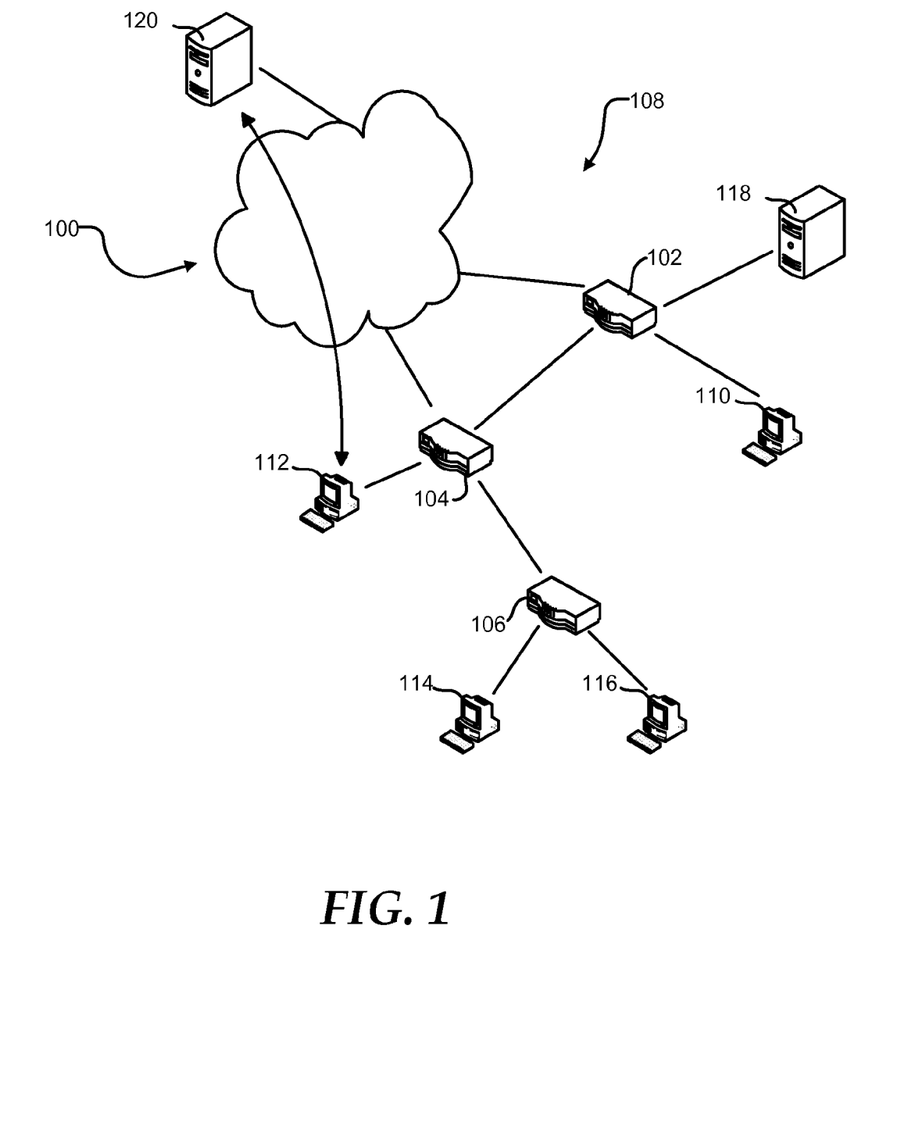
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120.

In an embodiment, a malicious system, such as client system 110 when infected with malicious software, can send a high volume of malicious requests to server 120. In attempting to respond to the malicious requests, server 120 may devote resources to respond to the malicious requests. With a sufficient volume of malicious requests, server 120 may be unable to devote sufficient resources to responding to legitimate requests, and thus the throughput and quality of legitimate network services provided by server 120 can be reduced.

Figure 2:
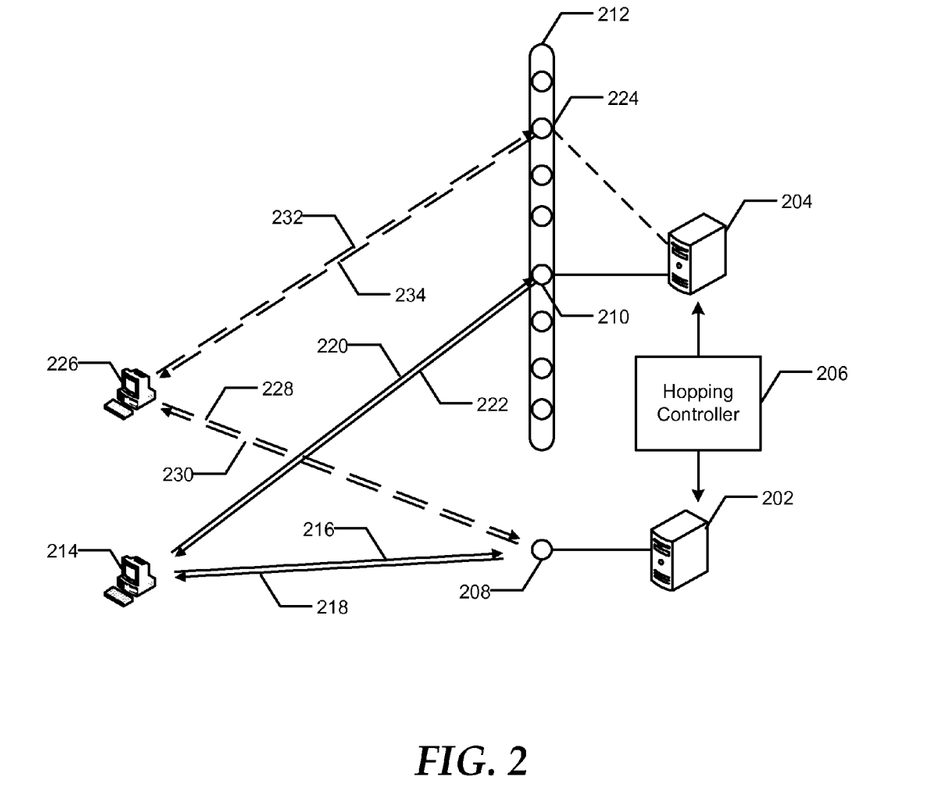
FIGS. 2 and 3 are block diagrams illustrating systems to detect and mitigate distributed denial-of-service (DDoS) attacks using random Internet Protocol (IP) hopping.

FIG. 2 illustrates a system 200 using random Internet Protocol (IP) hopping. System 200 can include a proxy 202, a service host 204, and a hopping controller 206. Hopping controller 206 can be implemented independently from proxy 202 and from service host 204, or can be implemented either by proxy 202 or by service host 204.

Proxy 202 can be bound to a service address 208. The service address 208 can include an IP address provided by a DNS system in response to a query for the address of a hostname associated with a network service.

Hopping controller 206 can randomly select a redirect address 210 from a pool of available redirect addresses 212. The redirect address 210 can include an IP address and an IP port number. The IP address, the IP port number, or any combination thereof can be randomly selected to determine the redirect address 210. The hopping controller 208 can provide the redirect address 210 to the proxy 202 and to the service host 204.

The service host 204 can bind to the redirect address 210 and provide content to client systems, such as client system 212, requesting content from the redirect address 210. In an example, client system 214 can send a request 216 to proxy 202 at service address 208. Proxy 202 can send a redirect instruction 218 to client system 214. Networking protocols such as hypertext transfer protocol (HTTP) and Session Initiation Protocol (SIP) provide the ability to send a redirect instruction in response to a request. The redirect instruction causes the client to resend the request to an address provided in the redirect instruction. The redirect instruction 218 can provide the redirect address 210 to client system 214. Client system 214 can then send a request 220 to service host 204 at redirect address 210, and service host 204 can establish a session 222 for providing content to client system 214.

After a service interval, the hopping controller 206 can randomly select redirect address 224 from the pool of available redirect addresses 212. The length of the service interval can be fixed or randomly generated, such as with a random timeout algorithm. The hopping controller 206 can provide the redirect address 224 to the proxy 202 and to the service host 204 so that proxy 202 can provide redirect address 224, and service host 204 can bind to redirect address 224.

In an example, after the service interval as indicated by the dashed lines, client system 226 can send a request 228 to the service address 208. The proxy 202 can respond to the client system 226 with a redirect instruction 230 indicating redirect address 224. Client system 226 can send a request 232 to redirect address 224 and service host 204 can establish a session 234 with client system 226 and provide content to client system 226.

After fixed or randomly determined periods of time, hopping controller 206 can continue to select additional redirect addresses at random from the pool of redirect addresses 212. Proxy 202 can redirect client systems from the service address 208 to the then current redirect address, and service host 204 may only accept new requests from the then current redirect address. In this way, the current address for sending requests to service host 204 can continually change, and the target of a DDoS attack can be difficult for an attacker to determine.

Figure 3:
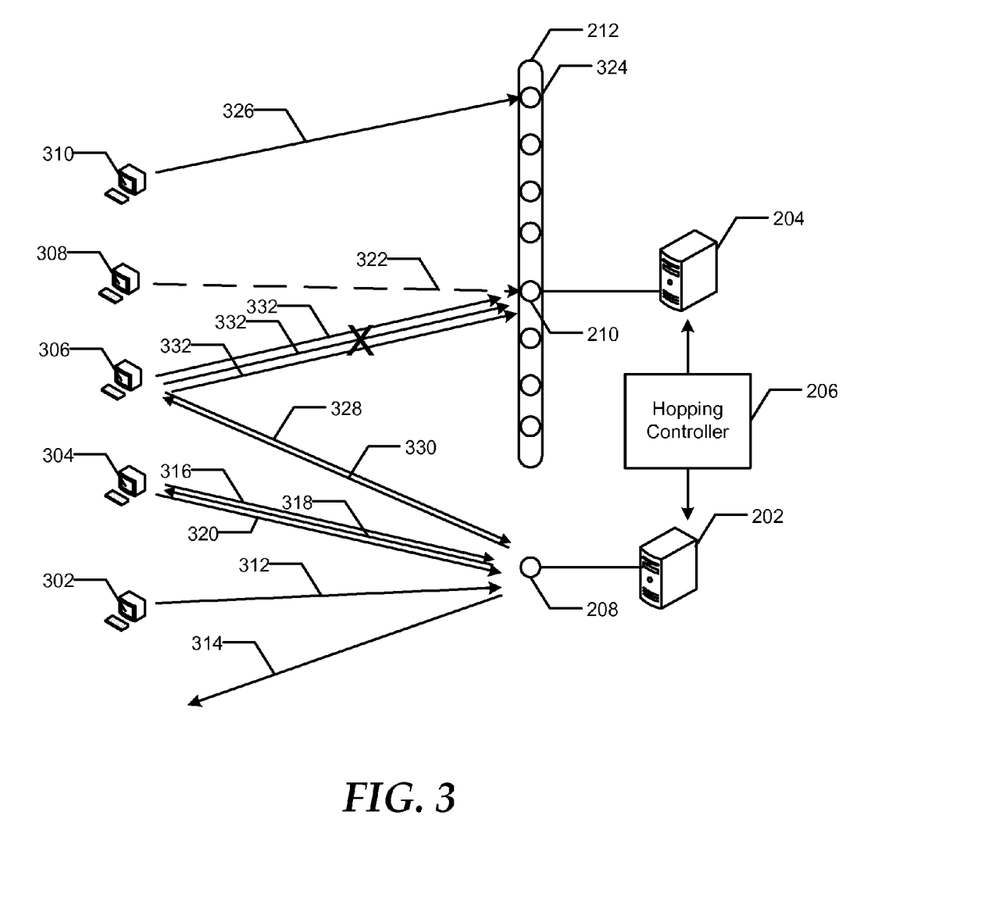

FIG. 3 illustrates the result of multiple types of DoS attacks against system 200. Attacking systems 302, 304, 306, 308, and 310 can implement different attack models against system 200. Generally, the attacks can be directed against the service address 208 that is known to the attacking systems 302, 304, 306, 308, and 310. Because proxy 202 may respond to requests with a redirect instruction and may not provide content, proxy 202 can be configured to respond to a high volume of requests. Further, if service from proxy 202 is interrupted by an attack, the attack may not affect existing sessions between service host 204 and client systems, such as client systems 214 and 226.

In an example of a spoofed attack, attacker 302 can send a request 312 to the service address 208. The request 312 can have a return address not associated with attacker 302. Attacker 302 can randomly select a return address and can utilize multiple return addresses in an attempt to avoid the attacks being blocked by a firewall. Proxy 202 can send a redirect instruction 314 to the return address in the request. However, the redirect instruction may not reach attacker 302, because the return address is not associated with attacker 302. In this way, attacker 302 may not have knowledge of the redirect address 210 or 224 and may be unable to attack service host 204.

In an example of a simple attack, attacker 304 can send a request 316 to the service address 208. In this attack, the return address can be an address associated with attacker 304. Proxy 202 can send a redirect instruction 318 to attacker 304. However, attacker 304 can ignore the redirect instruction 318 and can continue to send requests, such as request 320, to the service address 208. In another embodiment, attacker 304 may not establish a session with proxy 202 and may not receive the redirect instruction. For example, if attacker 304 only sends SYN packets to a web server, the SYN-ACK handshake may not be completed and a redirect instruction may not be sent. As with the spoofed attack, attacker 304 may not have knowledge of the redirect address 210 or 224 and may be unable to attack service host 204.

In an example of a sniffing attack, attacker 308 can observe network traffic to determine redirect address 210, and can send a request 322 to redirect address 210 after the service interval as indicated by the dashed line. However, service host 204 may not respond to requests sent to redirect address 210, thus limiting the effectiveness of the attack to the time when service host 204 is responding to requests sent to redirect address 210. With a sufficiently small service interval, the number of requests sent by attacker 308 may be small enough to not overwhelm service host 204. Additionally, it may be difficult for attacker 308 to determine the current redirect address before a new redirect address is selected. In an embodiment, system 200 can identify an attack when a large number of requests are sent to a redirect address that is not currently in use. When an attack is identified, steps can be taken to block the attack. For example, firewall rules can be implemented to block requests from attacker 308 on one or more of the addresses from the pool of available redirect addresses 212.

In an example of a guessing attack, attacker 310 can randomly select a redirect address, such as redirect address 324, from the pool of available redirect addresses 212. Attacker 310 can then send a request 326 to the redirect address 324. With a sufficiently large pool of available redirect addresses 212, the probability that attacker 310 can correctly guess the current redirect address can be insignificant. Additionally, the size of the pool of available redirect addresses 212 can be changed by adding or removing addresses, limiting the ability of attacker 310 to determine the pool of available redirect addresses 212 from which to guess and further reducing the likelihood of correctly guessing the current redirect address. As with the sniffing attack, steps can be taken to block the attack when a large number of requests are sent to a redirect address that is not currently in use.

In an example of a redirecting attack, attacker 306 can send a request 328 to the service address 208. Proxy 202 can send a redirect instruction 330 to attacker 306. Attacker 306 can process the redirect instruction 330 to determine the current redirect address 210, and can send requests 332 to redirect address 210 to attack service host 204. However, it may be necessary for attacker 306 to wait to receive redirect instruction 330 in order to attack service host 204, thus limiting the rate of attack. Additionally, it may be necessary for attacker 306 to send additional requests to the service address 208 and wait for redirect instructions to determine when the redirect address changes. Further, in order to receive the redirect instructions, it may be necessary for attacker 306 to use a correct return address, thereby enabling system 200 to accurately identify the attacker. In an embodiment, the attack can be identified when the rate of requests from attacker 306 exceeds a threshold. When the attack is identified, steps can be taken to block the attack.

Figure 4:
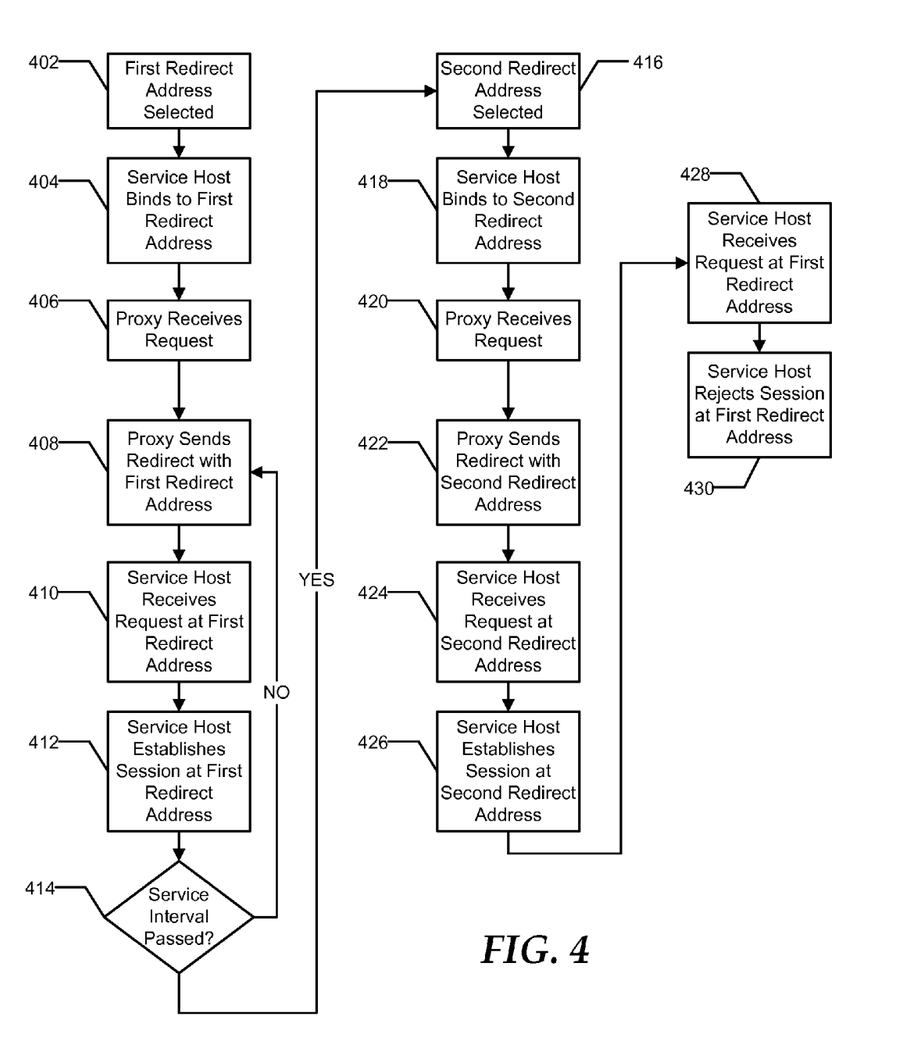
FIGS. 4 and 5 are flow diagrams illustrating exemplary methods of detecting and mitigating DDoS attacks using random IP hopping.

FIG. 4 illustrates an exemplary method of detecting and mitigating DDoS attacks using random Internet Protocol (IP) hopping. At 402, a first redirect address can be selected. In an embodiment, the first redirect address can include an IP address and an IP port number. One of the IP address, the IP port number, or a combination thereof can be randomly selected from a pool of available redirect addresses. The proxy and the service host can independently determine the first redirect address using a common algorithm. Alternatively, the proxy and the service host can communicate with each other or another system to determine the first redirect address. At 404, the service host can bind to the first redirect address.

At 406, a proxy can receive a request at a service address from a client system. The service address can be an address provided by a DNS server in response to a request for the address of a hostname associated with a network service. At 408, the proxy can send a redirect instruction to the client system. The redirect instruction can instruct the client system to send a request to the first redirect address.

At 410, the service host can receive a request sent to the first redirect address by the client system. At 412, the service host can establish a session with the client system through the first redirect address, and can provide content to the client system using the session.

At 414, the system can determine if a first service interval is passed. The service interval can have a predefined length or a random length, such as determined by a random timeout algorithm. In an embodiment, the proxy and the service host can independently determine the length of the service interval using a common algorithm, or they can communicate with each other or another system to determine the length of the service interval. When the service interval has not passed, in response to additional requests received by the proxy at the service address, the proxy can send additional redirect instructions with the first redirect, as illustrated at 408.

Alternatively, at 416 when the first service interval has passed, a second redirect address can be selected. At 418, the service host can bind to the second redirect address. At 420, the proxy can receive a request at the service address, and, at 422, the proxy can respond to the request with a redirect instruction including the second redirect address.

At 424, the service host can receive a request at the second service address, and, at 426, can establish a second session with the client system that sent the request. The second session can be established through the second redirect address. At 428, the service host can receive a request at the first service address. Because the request was received at the first service address after the service interval passed, at 430, the service host can reject a session with the client system sending the request.

In an embodiment, the service host can unbind from the first redirect address when the sessions established through the first redirect address have ended.

Figure 5:
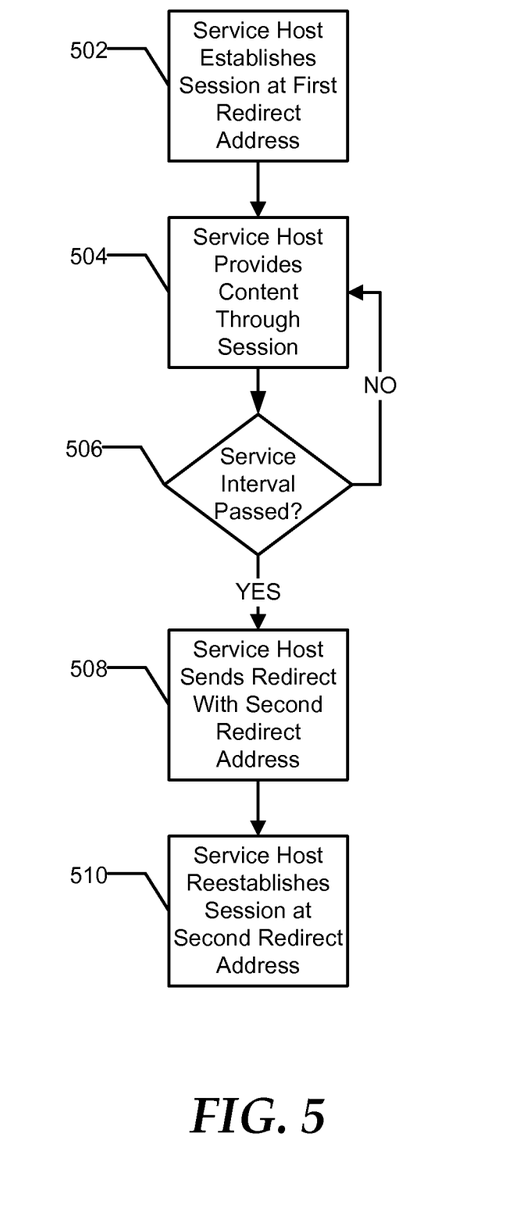

FIG. 5 illustrates an exemplary method of redirecting an existing session to another redirect address. At 502, a service host can establish a first session with a client system. The first session can be established through a first redirect address. At 504, the service host can provide content to the client system through the first session. At 506, the service host can determine if the service interval has passed. When the service interval has not passed, the service host can continue to provide content through the first session at 504.

Alternatively, when the service interval has passed, the service host can send a redirect instruction to the client system, as shown at 508. The redirect instruction can provide a second redirect address to the client system. At 510, the service host can reestablish the session with the client system through the second redirect address. In an embodiment, the service host can unbind from the first redirect address when all the sessions established through the first redirect address have ended or have been reestablished through the second redirect address.

Figure 6:
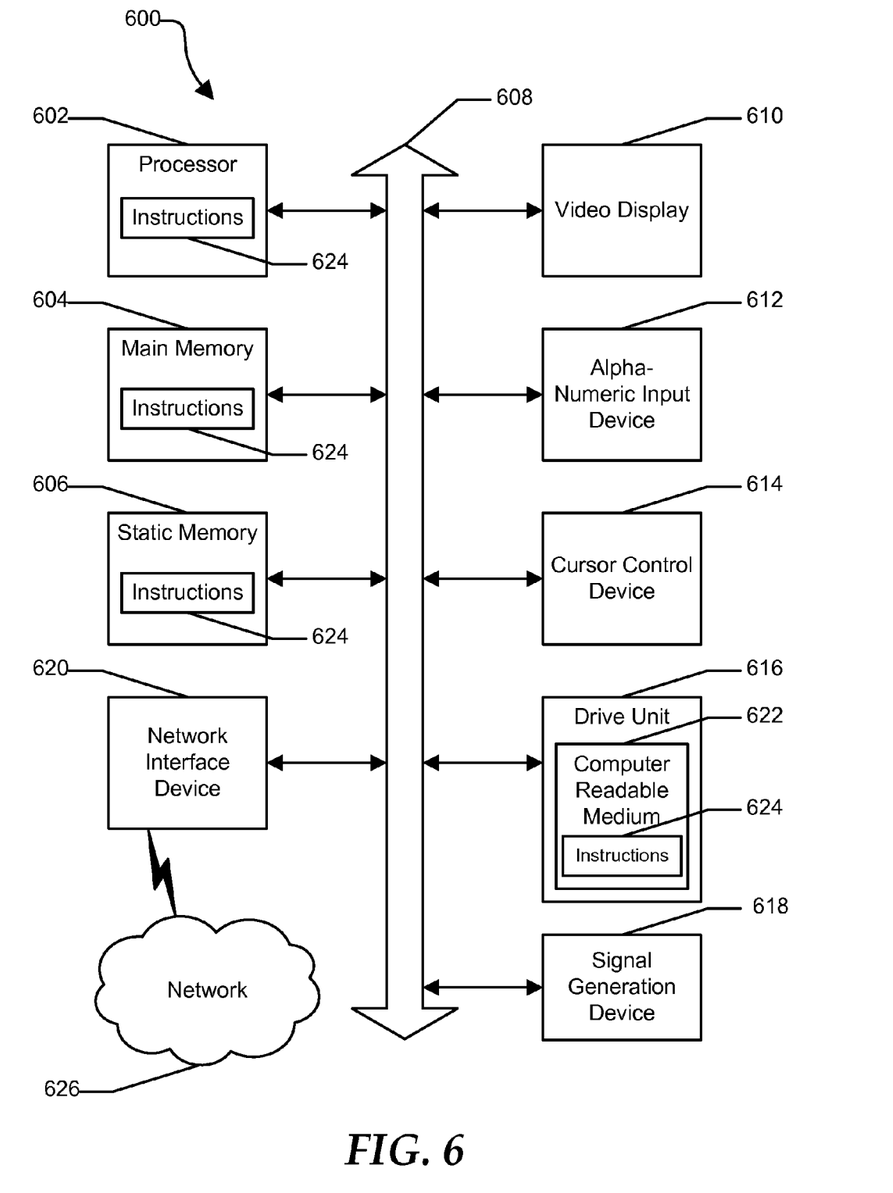
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a non-volatile computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The static memory 606, the main memory 604 and the processor 602 also may include non-volatile computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not

What is claimed is:

1. A method comprising:
   selecting, at random, a first redirect address from a pool of redirect addresses;
   sending a first redirect instruction to a first client in response to a first session request received at a service address that is provided by a domain name server, the first redirect instruction indicating the first redirect address, wherein the first session request includes a request for content, wherein the first redirect instruction causes the first client to resend the request for the content to the first redirect address;
   establishing a first session with the first client in response to a second session request received at the first redirect address, wherein the second session request includes the request for the content that the first redirect instruction caused the first client to resend;
   selecting, at random, a length of a first service interval, wherein the length of the service interval is determined using an algorithm;
   determining, by utilizing instructions stored in memory and executed by a processor, that the first service interval has passed;
   selecting, at random, a second redirect address from the pool of redirect addresses, wherein the first redirect address and the second redirect address each consist of an internet protocol address and port, and wherein one of the group consisting of internet protocol address, internet protocol port, and any combination thereof is randomly selected from the pool of redirect addresses;
   sending a second redirect instruction to a second client in response to a third session request received at the service address after the first service interval has passed, the second redirect instruction indicating the second redirect address;
   establishing a second session with the second client in response to a fourth session request received at the second redirect address after the first service interval has passed; and
   rejecting a fifth session request received from a third client at the first redirect address after the first service interval has passed.

2. The method of claim 1, further comprising:
   sending a third redirect instruction to the first client indicating the second redirect address after the first service interval has passed; and
   establishing a third session with the first client at the second redirect address.

3. The method of claim 2, further comprising unbinding from the first redirect address after sending the third redirect instruction and establishing the third session.

4. The method of claim 1, further comprising unbinding from the first redirect address after the first service interval has passed and the first session has ended.

5. A system comprising:
   a proxy server including a processor that executes instructions stored in memory to perform a first set of operations comprising:
      receiving a first session request from a first client to a service address that is provided by a domain name server, wherein the first session request includes a request for content;
      sending, in response to the first session request, a first redirect instruction to the first client indicating a first redirect address, wherein the first redirect instruction causes the client to resend the request for the content to the first redirect address;
      determining that a first service interval has passed;
      receiving, after the first service interval, a second session request from a second client to the service address; and
      sending, after the first service interval, a second redirect instruction to the second client indicating a second redirect address;
   a service host that performs a second set of operations comprising:
      receiving a third session request from the first client to the first redirect address, wherein the third session request includes the request for the content that the first redirect instruction caused the first client to resend;
      establishing a first session with the first client in response to the third session request;
      determining that the first service interval has passed;
      receiving, after the first service interval, a fourth session request from the second client to the second redirect address;
      establishing, after the first service interval, a second session with the second client in response to the fourth session request;
      receiving, after the first service interval, a fifth session request from a third client to the first redirect address; and
      rejecting the fifth session request; and
   a hopping controller that performs a third set of operations comprising:
      selecting the first redirect address randomly from a pool of redirect addresses;
      selecting the second redirect address randomly from the pool of redirect addresses, wherein the first redirect address and the second redirect address each consist of an internet protocol address and port, and wherein one of the group consisting of internet protocol address, internet protocol port, and any combination thereof is randomly selected from the pool of redirect addresses; and
      selecting, at random, a length of the first service interval, wherein the length of the service interval is determined using an algorithm.

6. The system of claim 5, wherein the third set of operations further comprise:
   sending an instruction to the proxy to redirect requests to the first redirect address and an instruction to the service host to bind to the first redirect address;

sending, after the first service interval has passed, an instruction to the proxy to redirect requests to the second redirect address and an instruction to the service host to bind to the second redirect address, wherein the proxy and the service host each determine that the first service interval has passed based on receiving instructions from the hopping controller.

7. The system of claim 5, wherein the second set of operations further comprise sending a third redirect instruction to the first client indicating the second redirect address after the first service interval has passed.

8. The system of claim 5, wherein the second set of operations further comprise unbinding from the first redirect address after the first service interval has passed and after the first session has been redirected.

9. The system of claim 5, wherein the second set of operations further comprise unbinding from the first redirect address after the first service interval has passed and after the first session has ended.

10. A computer-readable device comprising instructions, which, when loaded and executed by a processor, cause the processor to perform operations comprising:

selecting, at random, a first redirect address and a second redirect address from a pool of redirect addresses, wherein the first redirect address and the second redirect address each consist of an internet protocol address and port, and wherein one of the group consisting of internet protocol address, internet protocol port, and any combination thereof is randomly selected from the pool of redirect addresses;

receiving, at the first redirect address, a first session request from a first client, wherein the first session request is received in response to a first redirect instruction that was sent to the first client that caused the first client to resend a request for content, wherein the first session request includes the request for content that the first redirect instruction caused the first client to resend, wherein the request for content was sent to a service address provided by a domain name server prior to resending the request for content to the first redirect address;

establishing a first session with the first client in response to the first session request;

receiving, at the second redirect address, a second session request from a second client, wherein the second session request is received in response to a second redirect instruction;

selecting, at random, a length of a first service interval, wherein the length of the service interval is determined using an algorithm;

determining the second session request was received after the first service interval has passed;

establishing a second session with the second client in response to the second session request;

receiving a third session request for content from a third client to the first redirect address;

determining that the third session request was received after the first service interval has passed; and rejecting the third session request based on determining the third session request was received after the first service interval has passed.

11. The computer-readable device of claim 10, wherein the operations further comprise selecting, at random, a length of the first service interval.

12. The computer readable device of claim 10, wherein the operations further comprise sending a third redirect instruction to the first client after the first service interval has passed, the third redirect instruction indicating that the second redirect address, and establishing a third session with the first client at the second redirect address.

13. The computer-readable device of claim 10, wherein the operations further comprise unbinding from the first redirect address after sending the third redirect instruction and establishing the third session.

14. The computer-readable device of claim 10, wherein the operations further comprise unbinding from the first redirect address after the first service interval has passed and the first session has ended.

* * * * *